United States Patent [19]

Dryer

[11] 3,912,618

[45] Oct. 14, 1975

[54] OIL TREATMENT PROCESS

[75] Inventor: Stanley Raymond Collins Dryer, Feltham, England

[73] Assignee: The British Petroleum Company Limited, London, England

[22] Filed: July 30, 1973

[21] Appl. No.: 384,117

[30] Foreign Application Priority Data

Aug. 30, 1972  United Kingdom............... 40198/72

[52] U.S. Cl. .................... 208/87; 208/317; 208/327
[51] Int. Cl. ............................................. C10g 31/14
[58] Field of Search .......... 208/87, 28, 327, 317, 14

[56] References Cited
UNITED STATES PATENTS

| | | | |
|---|---|---|---|
| 2,155,644 | 4/1939 | Evans................................... | 208/327 |
| 3,514,395 | 5/1970 | McVay et al. ........................ | 208/14 |
| 3,567,626 | 3/1971 | Bozeman et al. .................... | 208/317 |
| 3,702,817 | 11/1972 | Cummins et al...................... | 208/87 |
| 3,732,154 | 5/1973 | Mills et al............................. | 208/87 |

*Primary Examiner*—Herbert Levine
*Attorney, Agent, or Firm*—Morgan, Finnegan, Pine, Foley & Lee

[57] ABSTRACT

A method of treating a mineral lubricating oil feed-stock comprises contacting the mineral oil feed-stock counter-currently with furfural in a first extraction column and recovering from the first column a primary raffinate and a primary extract. The furfural is removed from the primary extract, which extract is then contacted counter-currently with more furfural in a second extraction column.

A pseudo-raffinate and a secondary extract are recovered from the second column, the furfural being removed from the pseudo-raffinate. The pseudo-raffinate is then treated with a solvent for wax to remove at least part of the wax and then is catalytically hydrogenated.

19 Claims, No Drawings

OIL TREATMENT PROCESS

This invention relates to an improved process of preparing extracts having useful properties as extenders.

A known process for the treatment of mineral oils to be used as lubricating oils is by extraction with a solvent for example, furfural, and comprises circulating the oil to be refined and the solvent counter-currently in a column and withdrawing from the column two phases, a raffinate phase at the head of the column which contains the greater part of the required refined oil and a small quantity of solvent, and an extract phase at the bottom of the column which contains the greater part of the solvent together with aromatic, naphthenic and sulphurised hydrocarbons.

We have now devised a process for the treatment of the extract in order to prepare oils useful as rubber process oils and extenders, and as plasticizers, for thermoplastic polymers.

According to the invention there is provided a method of treating a mineral lubricating oil feedstock, which comprises contacting the mineral oil feed-stock counter-currently with furfural in a first extraction column and recovering from the first column a primary raffinate and a primary extract, removing the furfural from the primary extract and contacting the primary extract counter-currently with more furfural in a second extraction column and recovering from the second column a pseudo-raffinate and a secondary extract, removing the furfural from the pseudo-raffinate, treating the pseudo-raffinate with a solvent for wax to remove at least part of the wax and then catalytically hydrogenating the treated pseudo-raffinate.

In the treatment of mineral lubricating oil feed-stock in the first extraction column the oil is preferably introduced to a vertical treating zone, containing a large area of contact surface submerged in the oil. The process essentially comprises introducing the solvent at a point remote from the point of introduction of the oil, maintaining a body comprising oil in substantially continuous phase undergoing extraction within the vertical treating zone between the points of introduction of oil and solvent, the body of oil being relatively large with respect to the volume of solvent within the zone, moving the solvent counter-currently through said body, while in a relatively dispersed phase with respect to the oil, effecting contact between the oil and the solvent at a temperature of 100°F. and above, and maintaining a temperature differential between the points of solvent and oil introduction to said zone so that the temperature at the point of solvent introduction is at a substantially higher temperature than the point of oil introduction.

Preferably the oil to be extracted is conducted through a heat exchanger, wherein it is brought to the desired temperature and introduced to the lower portion of an extraction tower. The oil is introduced at a rate sufficient to maintain the tower full of oil.

Furfural is preferably conducted through a heat exchanger, wherein it is brought to the desired temperature, and thereafter introduced to the upper portion of the tower.

The tower is preferably packed with Raschig rings or other suitable packing material adapted to expose a relatively large area of contact surface, or alternatively a rotating disc contactor is used.

The furfural is sprayed over the top of the upper layer of packing material in a proportion suitable to maintain the desired film of solvent moving over the exposed surfaces of the packing material. The oil, as it rises through the packing material, is brought into very intimate contact with the film of solvent disposed over the packing material.

By filling the extraction tower full of oil and operating as above described, the solvent thus moves through the oil in a relatively dispersed phase with respect to the oil.

The furfural dissolves the more aromatic bodies and accumulates in the lower portion of the tower where it separates from the main body of the oil as an extract phase layer. The surplus extract phase accumulated in the bottom of the tower is drawn off. The rate at which it is drawn off may be controlled so as to maintain a substantially constant level of the extract phase in the bottom of the tower.

The raffinate or paraffinic oil, relatively insoluble in the furfural, rises to the top of the tower and overflows therefrom.

The extraction is carried out at the optimum column base temperature for the grade being processed e.g. 110°F for lower, 240°F for higher grades.

The primary extract phase separates from the primary raffinate phase at the bottom of the column and can be readily drawn off. The furfural is preferably removed from the primary extract phase by distillation.

In the second extraction column a process essentially the same as in the first extraction column is carried out, using a lower volume ratio of furfural/oil. In the second extraction column the pseudo-raffinate, relatively insoluble in the furfural, rises to the top of the column together with some furfural in a pseudo-raffinate phase where it is withdrawn. The furfural present in the pseudo-raffinate phase is preferably removed by distillation.

The volume ratio of furfural to primary extract oil feed is preferably 50–250%. The temperature at the top of the tower is preferably 40°–100°C dependent on the grade, and the temperature at the bottom of the tower is preferably 35°–80°C.

The pseudo-raffinate obtained can be dewaxed by use of a conventional dewaxing solvent, the preferred solvents are a mixture of methyl ethyl ketone (MEK) and toluene, preferably in a 60/40 vol. MEK/toluene ratio. A mixture of methylene dichloride and ethylene dichloride, or methylisobutylketone, can also be used.

In the dewaxing process the pseudo-raffinate oil is mixed with the dewaxing solvent liquid and introduced into a mixer. The oil and solvent are mixed in proportions such that at the temperature of dewaxing the solvent has a good, preferably substantially complete solvent action on the liquid constituents of the oil, and substantially no solvent action upon the solid hydrocarbon constituents of the oil.

The mixture of oil and solvent are chilled and the wax is precipitated. The wax can be removed from the oil e.g. by filtration or centrifuging. The solvent can be removed from the dewaxed oil by distillation.

The temperature of dewaxing is preferably below 0°C, and when the solvent used is a 60/40 vol. mixture of MEK and toluene preferred ratios of solvent to oil are 3–3.5:1.

The dewaxed pseudo-raffinate is preferably hydrogenated by passing the pseudo-raffinate and hydrogen under pressure over a hydrogenation catalyst.

The catalyst preferably comprises a transition metal oxide on an alumina base, more preferably a mixture of metal oxides are used. Examples of transition metals which can be used are cobalt, molybdenum, nickel, preferred mixtures are mixtures of cobalt and molybdenum oxides and the most preferred catalyst is a mixture of nickel, cobalt and molybdenum oxides on an alumina substrate.

The hydrogenation preferably takes place at a temperature above 300°C more preferably from 330°–400°C. The pressure in the reactor is preferably at least 70 atmospheres, more preferably 70–120 atmospheres.

The space velocity of hydrogen to pseudo-raffinate is preferably from 0.45 v/v/hr to 2.0 v/v/hr.

The treated oils obtained by the process can be used as plasticizers and extenders in rubber and plastics material.

It is a feature of the present invention that it enables the production of an hydrocarbon composition of boiling point 300 to 600°C having an aromatic content of greater than 50% and a viscosity index of greater than 50 to be carried out.

Preferably the aromatic content is from 50–70% and the viscosity index is greater than 60.

The aromatic content of the oil can be obtained by test method ASTM D2007, and the viscosity index by test method ASTM D2270-14.

The invention will now be described with reference to the following Examples.

EXAMPLE 1

A primary extract was obtained by furfural extraction of Middle East distillate boiling in the range 478°–540°C. The properties of the extract are listed below in Table 1.

Table 1

| Extract | | A |
|---|---|---|
| Kinematic viscosity at 37.8°C | cSt | 726 |
| Kinematic viscosity at 98.9°C | cSt | 22.7 |
| Specific gravity (15.5/15.5°C) | | 0.989 |
| Aniline point | °C | 47.8 |
| Clay-Gel Analysis (ASTM D-2007) | | |
| Saturates | % wt | 16.0 |
| Aromatics | % wt | 74.5 |
| Polars | % wt | 9.5 |

The extract was reprocessed through a refinery furfural extraction unit, the operating conditions used and yields obtained are listed below in Table 2. The products were a pseudo-raffinate and a secondary extract.

Table 2

| Extract | | A |
|---|---|---|
| Furfural/oil ratio | v/v | 0.55:1 |
| Column temperature | - top °C | 65 |
|  | - base °C | 38 |
| Pseudo-Raffinate Yield | | |
| % wt. Oil feed | | 70 |

The properties of the pseudo-raffinate are listed below in Table 3.

Table 3

| Waxy Pseudo-Raffinate | | A |
|---|---|---|
| Kinematic viscosity at 37.8°C | cSt | 337 |
| Kinematic viscosity at 98.9°C | cSt | 17.2 |
| Specific gravity (15.5/15.5°C) | | 0.955 |
| Aniline point | °C | 65.7 |
| Pour point | °C | 29.5 |
| Clay-Gel Analysis (ASTM D-2007) | | |
| Saturates | % wt | 22.9 |
| Aromatics | % wt | 71.8 |
| Polars | % wt | 5.3 |

The pseudo-raffinate was commercially dewaxed with methyl ethyl ketone/toluene solvent to give a product of pour point −15°C in a yield of 96 percent.

The dewaxed product was processed through a pilot catalytic hydrogenation unit over a commercial catalyst comprising nickel, cobalt and molybdenum oxides on an alumina base. The catalyst was pre-sulphided by processing the dewaxed pseudo-raffinate at successively increasing reactor temperature.

The treated product obtained under optimum operating conditions was stripped of volatile by-products in an on-line stripper operating under vacuum. Hydrogen sulphide and ammonia were removed from the recycle gas by co-current extraction with water.

The operating conditions, yields and finished product properties are listed below in Table 4.

Table 4

| Finished Pseudo-Raffinate | | A |
|---|---|---|
| Reactor pressure | bar(ga) | 103 |
| Average catalyst bed temperature | °C | 370 |
| Space velocity | v/v/h | 0.49 |
| Recycle gas rate | mol/M$^3$ | 30800 |
| Stripped product yield | % wt | 85.6 |
| Product Quality | | |
| Kinematic viscosity at 37.8°C | cSt | 130.2 |
| Kinematic viscosity at 98.9°C | cSt | 10.84 |
| Pour point | °C | −6 |
| Specific gravity (15.5/15.5°C) | | 0.909 |
| Flash point (COC) | °C | 243 |
| Refractive index $n_D^{20}$ | | 1.503 |
| Colour - ASTM D-1500 | | L1.5 |
| Sulphur content | % wt | 0.13 |
| Aniline point | °C | 87.2 |
| Viscosity-gravity constant | | 0.845 |
| Ring Analysis (Sun Oil Method) | | |
| $C_A$ | | 16 |
| $C_N$ | | 26 |
| $C_P$ | | 58 |
| Clay-Gel Analysis (ASTM D-2007) | | |
| Saturates | % wt | 47.3 |
| Aromatics | % wt | 51.9 |
| Polars | % wt | 0.8 |
| UV absorptivity at 260 nM | | 4.3 |

EXAMPLE 2

A primary extract was obtained by furfural extraction of a Middle East distillate boiling in the range 478°–540°C, during commercial production of a basic grade lubricant. The properties of the extract are listed in Table 5.

Table 5

| Extract | | |
|---|---|---|
| Kinematic viscosity at 37.8°C | cSt | 740 |
| Kinematic viscosity at 98.9°C | cSt | 23.2 |
| Specific gravity (15.5/15.5°C) | | 0.989 |
| Aniline point | °C | 49.7 |

Table 5-Continued

Extract

| Clay-Gel Analysis (ASTM D-2007) | | |
|---|---|---|
| Saturates | % wt | 16.1 |
| Aromatics | % wt | 73.8 |
| Polars | % wt | 10.1 |

The extract was reprocessed through a pilot furfural extraction unit. The products were a secondary extract and a pseudo-raffinate. The operating conditions and yield are listed in Table 6.

Table 6

Extract

| | | |
|---|---|---|
| Furfural/oil ratio | v/v | 1.50:1 |
| Column temperature | - top °C | 100 |
| | - base °C | 55 |
| Pseudo-Raffinate Yield | | |
| % wt Oil feed | | 40 |

The properties of the pseudo-raffinate are listed in Table 7.

Table 7

Waxy Pseudo-Raffinate

| | | |
|---|---|---|
| Kinematic viscosity at 37.8°C | cSt | 193 |
| Kinematic viscosity at 98.9°C | cSt | 13.7 |
| Specific gravity (15.5/15.5°C) | | 0.934 |
| Aniline point | °C | 78.7 |
| Pour point | °C | 41 |
| Clay-Gel Analysis (ASTM D-2007) | | |
| Saturates | % wt | 30.7 |
| Aromatics | % wt | 65.7 |
| Polars | % wt | 3.6 |

The pseudo-raffinate was dewaxed using an methylene chloride/ethylene dichloride solvent to give a yield of 90% wt. of a product of pour point −9°C.

The treated product obtained under optimum operating conditions was stripped of volatile by-products in an on-line stripper operating under vacuum. Hydrogen sulphide and ammonia were removed from the recycle gas by co-current extraction with water.

The operating conditions, yields and finished product properties are listed below in Table 8.

Table 8

Finished Pseudo-Raffinate

| | | |
|---|---|---|
| Reactor pressure | bar (ga) | 103 |
| Average catalyst bed temperature | °C | 370 |
| Space velocity | v/v/h | 0.48 |
| Recycle gas rate | mol/M$^3$ | 31200 |
| Stripped product yield | % wt | 85.3 |
| Product Quality | | |
| Kinematic viscosity at 37.8°C | cSt | 120.4 |
| Kinematic viscosity at 98.9°C | cSt | 10.57 |
| Pour point | °C | −1 |
| Specific gravity (15.5/15.5°C) | | 0.905 |
| Flash point (COC) | °C | 250 |
| Refractive index $n_D^{20}$ | | 1.499 |
| Colour - ASTM D-1500 | | L1.0 |
| Sulphur content | % wt | 0.07 |
| Aniline point | °C | 90.2 |
| Viscosity-gravity constant | | 0.838 |
| Ring Analysis (Sun Oil Method) | | |
| $C_A$ | | 11 |
| $C_N$ | | 30 |
| $C_P$ | | 59 |
| Clay-Gel Analysis (ASTM D-2007) | | |

Table 8-Continued

Finished Pseudo-Raffinate

| | | |
|---|---|---|
| Saturates | % wt | 48.1 |
| Aromatics | % wt | 51.1 |
| Polars | % wt | 0.8 |
| UV absorptivity at 260 nM | | 2.8 |

The finished products of Examples 1 and 2 were compared for stability to UV radiation in rubber formulation against two commercially used rubber extender oils. Formulation and vulcanization conditions are given below in Table 9.

Table 9

| | Parts/100 Resin |
|---|---|
| Fast-curing EPDM | 100 |
| Titanium dioxide | 40 |
| Coated calcium carbonate | 50 |
| Oil | 20 |
| Volcafor DHC | 1.5 |
| Vulcafor MBT | 0.5 |
| Sulphur | 2.0 |
| Vulcanized 20 min at 153°C | |

The vulcanized samples were irradiated in an oven conforming to ASTM D-1148 (discolouration of vulcanized rubbers) requirements under a Phillips MU 300 watt lamp for 72 hours. Discolouration was measured by reflectance in a Lovibond Tintometer and reported as the sum of Y + R units. The values obtained are shown in Table 10.

Table 10

| | Finished Product Ex.1 | Finished Product Ex.2 | Ref. C Solvent-Treated Naphthenic Oil | Ref. D Treated Naphthenic Distillate |
|---|---|---|---|---|
| Reflectance after radiation | 3.2 | 1.7 | 1.2 | 3.7 |
| Oil absorptivity at 260 nM | 4.3 | 2.8 | 3.3 | 5.7 |

The reference oils C and D were commercially used extender oils and their properties are shown in Table 10a below.

Table 10a

| | Oil C | Oil D |
|---|---|---|
| VI | 41 | 0 |
| $C_A$ | 9 | 16 |
| $C_N$ | 36 | 45 |
| $C_P$ | 55 | 39 |
| Saturates | 65.3 | 56.6 |
| Aromatics | 33.5 | 42.8 |
| Polar | 1.2 | 0.6 |

EXAMPLE 3

Further pseudo-raffinates were obtained from distillates of different boiling ranges by the process of Example 2. The reflectance values are shown in Table 11.

Table 11

| Finished Product | E | F | G |
|---|---|---|---|
| Distillate range °C (TBP) | 384–412 | 412–457 | 546 |
| Reflectance | 0.9 | 0.8 | 2.7 |

Thus, the finished pseudo-raffinates possess good non-staining characteristics. Viscosity/temperature characteristics, specific gravity, refractive index and viscosity-gravity constant of the products are comparable with those obtained on solvent-treated oils from naphthenic and paraffinic/naphthenic crudes; however, ring analysis and ASTM D-2007 data show a higher level of aromaticity with subsequent improved compatability in relatively unsaturated polymers such as styrene-butadiene rubber, natural rubber and the fast-curing types of EPDM rubber. The Products exhibit properties intermediate to solvent oils and treated naphthenic distillates; ring analysis data show combinations of $C_A$ and $C_P$ with ASTM D-2007 data indicating that a significant proportion of the paraffinic components are present as alkyl side-chains on aromatic nuclei, giving a molecular structure that is conducive to higher cohesive energies with polymer networks containing pendant unsaturated linkages.

The dewaxed pseudo-raffinates also exhibit useful characteristics, compared with conventional extract extender oils. Specific gravity and polar content are lower, giving more favourable weight/volume relationships and improved scorch characteristics in rubber compounds, whilst aromaticity is maintained at a level consistent with good compatibility.

I claim:

1. A method of treating a mineral lubricating oil feed-stock, which comprises
   contacting the mineral oil feed-stock counter-currently with furfural in a first extraction column,
   recovering from the first column a primary raffinate and a primary extract,
   removing the furfural from the primary extract,
   contacting the primary extract counter-currently with more furfural in a second extraction column,
   recovering from the second column a pseudo-raffinate and a secondary extract,
   removing the furfural from the pseudo-raffinate,
   treating the pseudo-raffinate with a solvent for wax to remove at least part of the wax, and then
   catalytically hydrogenating the treated pseudo-raffinate.

2. The method according to claim 1 in which the furfural is removed from the primary extract by distillation.

3. The method according to claim 1 in which the temperature at the top of the second extraction column is 40°–100°C and the temperature at the bottom of the column is 35°–80°C.

4. The method according to claim 1 in which a lower volume ratio of furfural to oil is used in the second extraction column than the first extraction column.

5. The method according to claim 1 in which the volume ratio of furfural to primary extract oil feed is 50–250%.

6. The method according to claim 1 in which the pseudo-raffinate is treated for removing wax below a temperature of 0°C.

7. The method according to claim 1 in which the pseudo-raffinate is hydrogenated by passing the pseudo-raffinate and hydrogen under pressure over a hydrogenation catalyst comprising a transition metal oxide on an alumina base or a mixture of transition metal oxide on an alumina base.

8. The method according to claim 7 in which the transition metal oxides are oxides of cobalt, molybdenum, or nickel.

9. The method according to claim 7 in which the hydrogenation catalyst comprises a mixture of nickel, cobalt and molybdenum oxides on an alumina base.

10. The method according to claim 1 in which the hydrogenation takes place above 300°C.

11. The method according to claim 10 in which the hydrogenation takes place between 330° to 400°C.

12. The method according to claim 1 in which the pressure of hydrogenation is at least 70 atmospheres.

13. The method according to claim 12 in which the pressure of hydrogenation is 70–120 atmospheres.

14. The method according to claim 7 in which the space velocity of hydrogen to pseudo-raffinate is 0.45 volume/volume/hour to 2.0 volume/volume/hour.

15. The method of claim 1 in which the step of contacting the mineral oil feed-stock counter-currently with furfural in the first extraction column comprises
    introducing the furfural and oil into a vertical treating zone in said column wherein the furfural is introduced at a point remote from the point of introduction of the oil and the volume of oil being relatively large with respect to the volume of furfural introduced into said zone,
    maintaining the temperature of the oil and furfural in the zone at 100°F and above and maintaining a temperature differential between the points of furfural and oil introduction into said zone so that the temperature at the point of furfural introduction is substantially higher than the temperature at the point of oil introduction,
    moving said furfural counter-currently through said oil in said treating zone wherein the oil is substantially in a continuous phase and the furfural is in a relatively dispersed phase with respect to the oil, and
    causing extraction of said oil into two phases, a primary extract phase and a primary raffinate phase.

16. The method according to claim 15 in which the oil to be extracted is conducted through a heat exchanger in which the oil is brought to the desired temperature and then introduced to the lower portion of the vertical treating zone.

17. The method according to claim 1 in which the solvent for removing wax from the pseudo-raffinate is a mixture of methyl ethyl ketone and toluene.

18. The method according to claim 17 in which the solvent is in a 60/40 volume ratio of methyl ethyl ketone and toluene and the ratio of solvent to the oil lies within the ranges 3:1 to 3.5:1.

19. The method according to claim 1 in which the solvent for wax is selected from the group consisting of methylisobutylketone and mixtures of methylene dichloride and ethylene dichloride.

* * * * *